US012006383B2

(12) United States Patent
Moreso et al.

(10) Patent No.: US 12,006,383 B2
(45) Date of Patent: Jun. 11, 2024

(54) TERPOLYMERS OF ETHYLENE, 1,3-BUTADIENE AND AN AROMATIC a-MONOOLEFIN

(71) Applicant: COMPAGNIE GENERALE DES ETABLISSEMENTS MICHELIN, Clermont-Ferrand (FR)

(72) Inventors: Emma Moreso, Clermont-Ferrand (FR); Vincent Lafaquiere, Clermont-Ferrand (FR); Julien Thuilliez, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 446 days.

(21) Appl. No.: 17/415,540

(22) PCT Filed: Dec. 2, 2019

(86) PCT No.: PCT/FR2019/052887
§ 371 (c)(1),
(2) Date: Jun. 17, 2021

(87) PCT Pub. No.: WO2020/128196
PCT Pub. Date: Jun. 25, 2020

(65) Prior Publication Data
US 2022/0056175 A1   Feb. 24, 2022

(30) Foreign Application Priority Data
Dec. 20, 2018 (FR) ........................................ 1873543

(51) Int. Cl.
*C08F 210/02*   (2006.01)
*B60C 1/00*   (2006.01)

(52) U.S. Cl.
CPC .............. *C08F 210/02* (2013.01); *B60C 1/00* (2013.01); *C08F 2420/10* (2021.01); *C08F 2800/10* (2013.01); *C08F 2810/20* (2013.01)

(58) Field of Classification Search
CPC ...... C08F 4/545; C08F 210/02; C08F 212/08; C08F 236/06
USPC .................................................. 526/164, 339
See application file for complete search history.

(56) References Cited

U.S. PATENT DOCUMENTS

| 7,094,854 B2 * | 8/2006 | Monteil ................ C08F 210/02 526/160 |
| 2020/0157268 A1 | 5/2020 | Thuilliez et al. |
| 2021/0079135 A1 | 3/2021 | Thuilliez et al. |

FOREIGN PATENT DOCUMENTS

| WO | 2018104669 A1 | 6/2018 |
| WO | 2018224775 A1 | 12/2018 |
| WO | 2018224776 A1 | 12/2018 |

OTHER PUBLICATIONS

Thuilliez, et al, "Ansa-Bis(fluorenyl)neodymium Catalyst for Cyclopolymerization of Ethylene and Butadiene," Macromolecules 2009, 42, 3774-3779. (Year: 2009).*
Machine-generated English translation of WO 2018/104669A1, retrieved from ESPACENET on Jan. 26, 2024. (Year: 2018).*
International Search Report with translation and Written Opinion corresponding to PCT/FR2019/052887 dated May 14, 2020.

* cited by examiner

*Primary Examiner* — Fred M Teskin
(74) *Attorney, Agent, or Firm* — Dickinson Wright PLLC

(57) ABSTRACT

A terpolymer of ethylene, of 1,3-butadiene and of an aromatic α-monoolefin is provided. The terpolymer contains
  more than 60 mol %, preferably at least 70 mol %, and preferably at most 90 mol % of ethylene units,
  at most 10 mol % of aromatic α-monoolefin units and 1,2-cyclohexanediyl units.
Such a diene terpolymer rich in ethylene units has the advantage of exhibiting a reduced, or even zero, crystallinity.

20 Claims, No Drawings

TERPOLYMERS OF ETHYLENE, 1,3-BUTADIENE AND AN AROMATIC α-MONOOLEFIN

This application is a 371 national phase entry of PCT/FR2019/052887 filed on 2 Dec. 2019, which claims benefit of French Patent Application No. 1873543, filed 20 Dec. 2018, the entire contents of which are incorporated herein by reference for all purposes.

BACKGROUND

1. Technical Field

The field of the present invention is that of polymers which are terpolymers of ethylene, of 1,3-butadiene and of an aromatic α-monoolefin.

2. Prior Art

The polymers conventionally used in tire rubber compositions are elastomers which are homopolymers or copolymers of 1,3-butadiene or of isoprene, such as polybutadienes (BRs), synthetic polyisoprenes (IRs), natural rubber (NR) or copolymers of 1,3-butadiene and of styrene (SBRs). The point common to these polymers is the high molar proportion of 1,3-diene units in the polymer, generally much greater than 50%, which can render them sensitive to oxidation, in particular under the action of ozone. They are denoted below as polymers rich in 1,3-diene units.

It is known to use, in tire rubber compositions, copolymers exhibiting a reduced sensitivity to oxidation. Mention may be made, for example, of butyl rubbers, EPDM terpolymers, copolymers of ethylene and of 1,3-butadiene which all contain more than 50 mol % of an α-monoolefin or of ethylene. Copolymers of ethylene and of 1,3-butadiene, when they are used in a tire rubber composition in place of polymers rich in 1,3-diene units, are also known to modify the compromise in performance between the wear resistance and the rolling resistance of the tire. The synthesis of these copolymers and their use in a tire rubber composition are, for example, described in documents EP 1 092 731, WO 200754224, WO 2007054223 and WO 2014114607.

It may be advantageous to have available copolymers of ethylene and of 1,3-diene which are even richer in ethylene, for example in order to further increase the resistance of the copolymer to oxidation or in order to reduce the cost of manufacture of the copolymer. In point of fact, it turns out that copolymers of ethylene and of 1,3-diene may be crystalline when the proportion of ethylene in the copolymer becomes very high, for example greater than 70 mol %. As the melting of the crystalline parts of the copolymer results in a fall in its stiffness, a rubber composition containing such a copolymer and used in a tire will also experience a decrease in its stiffness when it is brought to temperatures equaling or exceeding the melting point of the crystalline parts, which may be the case during repeated phases of braking and of acceleration of the tire. This dependency of the stiffness as a function of the temperature can thus result in uncontrolled fluctuations in the performance qualities of the tire.

The applicant has described in WO 2018/104669 a diene polymer rich in ethylene units, the crystallinity of which is reduced. This polymer is composed of ethylene units, 1,3-diene units and aromatic α-monoolefin units in which the molar ratio between the content of the ethylene units and the sum of the contents of the ethylene units and of the 1,3-diene units is greater than 0.7. This terpolymer contains more than 50 mol % to 80 mol % of ethylene units and from 10 mol % to less than 40 mol % of aromatic α-monoolefin units, the 1,3-diene being 1,3-butadiene or isoprene.

It nevertheless remains of interest to have available diene polymers based on ethylene, the content of ethylene units of which can be increased without, however, increasing the crystallinity of the polymer.

SUMMARY

The applicant has discovered a novel diene polymer rich in ethylene units, the crystallinity of which is reduced, indeed even eliminated.

Thus, a first subject of the invention is a terpolymer of ethylene, of 1,3-butadiene and of an aromatic α-monoolefin containing more than 60 mol % of ethylene units and at most 10 mol % of aromatic α-monoolefin units, and also 1,2-cyclohexanediyl units. In particular, the terpolymer is an elastomer.

The invention also relates to a process for the preparation of the terpolymer in accordance with the invention.

Another subject-matter of the invention is a rubber composition based on the elastomer in accordance with the invention, on a reinforcing filler and on a crosslinking system.

Another subject-matter of the invention is a semi-finished article which comprises the rubber composition in accordance with the invention.

Another subject-matter of the invention is a tire comprising the rubber composition in accordance with the invention or the semi-finished article in accordance with the invention.

DETAILED DESCRIPTION

In the present description, any interval of values denoted by the expression "between a and b" represents the range of values greater than "a" and lower than "b" (that is to say, limits a and b excluded), whereas any interval of values denoted by the expression "from a to b" means the range of values extending from "a" up to "b" (that is to say, including the strict limits a and b).

The expression "based on" used to define the constituents of a catalytic system or of a composition is understood to mean the mixture of these constituents, or the product of the reaction of a portion or of all of these constituents with one another.

The expression "ethylene unit" refers to the —(CH$_2$—CH$_2$)— moiety resulting from the insertion of the ethylene into the terpolymer. The expression "1,3-diene unit" refers to the units resulting from the insertion of the 1,3-butadiene by a 1,4-addition or a 1,2-addition. According to the description, the term "content of 1,3-butadiene units" is understood to mean the sum of the contents of 1,2 units and of 1,4 units. The expressions "1,2 units" and "1,4 units" refer respectively to the units resulting from the insertion of 1,3-butadiene by a 1,2-addition and by a 1,4-edition, which may be cis and trans, corresponding to the formulae below (1,4-cis unit not shown).

1,2 Bdt

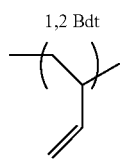

1,2 Unit

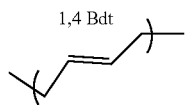

1,4-trans Unit

The expression "aromatic α-monoolefin unit" refers to the —(CH₂—CHAr)— moiety resulting from the insertion of the aromatic α-monoolefin into the terpolymer.

The expression "1,2-cyclohexanediyl unit" refers to the 1,2-cyclohexanediyl moiety of formula

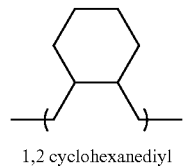

1,2 cyclohexanediyl which results from a very particular insertion of the ethylene and 1,3-butadiene monomers into the terpolymer.

Unless otherwise indicated, the contents of the units resulting from the insertion of a monomer into the terpolymer are expressed as molar percentage relative to all of the monomer units of the terpolymer. By definition, each of the molar percentages of ethylene units, styrene units, 1,3-butadiene units and 1,2-cyclohexanediyl units in the polymer is strictly greater than 0.

The compounds mentioned in the description may be of fossil or biobased origin. In the latter case, they can result, partially or completely, from biomass or be obtained from renewable starting materials resulting from biomass. The monomers are concerned in particular.

The terpolymer in accordance with the invention has the essential characteristic of being a terpolymer of ethylene, of 1,3-butadiene and of an aromatic α-monoolefin, and of comprising 1,2-cyclohexanediyl units.

Another characteristic of said terpolymer is also that it contains more than 60 mol % of ethylene units, preferably at least 70% and more preferentially at least 80%, or even more than 80%. Due to this content, the terpolymer in accordance with the invention is regarded as a diene polymer rich in ethylene units. The terpolymer in accordance with the invention advantageously comprises at most 90 mol % of ethylene units. According to a preferential variant, the terpolymer in accordance with the invention comprises at least 70 mol %, more preferentially at least 80 mol %, or even more than 80 mol %, and at most 90 mol % of ethylene units.

Another characteristic of the terpolymer in accordance with the invention is also that it contains at most 10 mol % of aromatic α-monoolefin units, preferably less than 10%. Thus, the benefit of such a low content of aromatic α-monoolefin units lies in particular in the contribution to reducing the cost of manufacturing such a terpolymer.

Thus, degrees of crystallinity of less than 10%, or even zero, can be obtained with, on the one hand, a high content of ethylene units and, on the other hand, a low content of styrene units.

The characteristics of crystallinity and of glass transition temperature of the terpolymers in accordance with the invention can be attributed to the microstructure of the terpolymers, in particular to the presence of the 1,2-cyclohexanediyl units and to the relative content of the monomers in the terpolymer, and also to the random distribution of the aromatic α-monoolefin units in the terpolymer.

According to any one of the embodiments of the invention, the terpolymer is preferably a random terpolymer.

An alpha-olefin (α-olefin) is understood to mean a terminal olefin, that is to say that it contains the vinyl group of formula —CH═CH₂. A monoolefin is understood to mean a monomer which contains a single carbon-carbon double bond, apart from those of the benzene ring of the aromatic group.

Typically, the aromatic α-monoolefin is of formula CH₂═CH—Ar, in which the symbol Ar represents an aromatic group. The aromatic group can be a substituted or unsubstituted phenyl. Suitable as aromatic α-monoolefin are styrene, styrenes substituted by one or more alkyl groups in the para, meta or ortho positions, or mixtures thereof. Preferably, the aromatic α-monoolefin is styrene.

According to another embodiment of the invention, the content of the 1,3-butadiene units in the terpolymer is greater than 3 mol % of the monomer units of the terpolymer, preferably at least 5%.

When the terpolymer is brought together with a crosslinking agent, in particular a vulcanization agent, in a rubber composition, a content of 1,3-butadiene units of greater than 3%, in particular of at least 5%, makes it possible to obtain, within the rubber composition, a crosslinked polymer which is particularly suitable for use in a tire semi-finished article.

The content of 1,3-butadiene units in the terpolymer is preferably less than 30 mol % of the monomer units of the terpolymer, more preferably less than 20 mol % of the monomer units of the terpolymer, even more preferentially less than 15 mol %, which makes it possible to increase the resistance to oxidation of the terpolymer.

According to one preferential embodiment, the terpolymer in accordance with the invention may contain less than 60 mol % of 1,4 units of the 1,3-butadiene units. The 1,4 units are preferentially essentially 1,4-trans units, the 1,4-cis units being in negligible amount. Even more preferentially, the 1,2 units represent at least 50 mol % of the 1,3-butadiene units.

According to one particularly preferential embodiment of the invention, the terpolymer in accordance with the invention is a terpolymer in which
    the content of ethylene units ranges from 70 mol % to 90 mol %, preferably from 80 mol % to 90 mol;% of the monomer units of the terpolymer,
    the content of 1,3-butadiene units ranges from 5 to 20 mol %, preferably from 5 mol % to 15 mol % of the monomer units of the terpolymer,
    the content of aromatic α-monoolefin units of at most 10 mol %, preferably less than 10 mol %, of the monomer units of the terpolymer
and the terpolymer comprising 1,2-cyclohexanediyl units. The 1,2 units then preferably represent at least 50 mol % of the 1,3-butadiene units.

Such a polymer exhibits a very low degree of crystallinity, or even zero. The terpolymer according to this particularly preferential embodiment of the invention exhibits the characteristics most appropriate for use in a tire rubber composition.

According to any one of the embodiments of the invention, the terpolymer is preferably a terpolymer of ethylene, of 1,3-butadiene and of styrene.

The embodiments of the invention, which may or may not be preferential, and also the variants and preferential aspects can be combined with one another, subject to their compatibility.

The terpolymer in accordance with the invention can be synthesized by a process, which is another subject matter of the invention, which comprises the polymerization of ethylene, of the 1,3-butadiene and of the aromatic α-monoolefin in the presence of a catalytic system based on a rare-earth metallocene and on an organometallic compound as cocatalyst.

The metallocene corresponds to formula (I):

{P(Cp$^1$)(Cp$^2$)Met-G}$_b$  (I)

in which
Met represents a rare-earth metal atom,
the symbol G denoting a halogen atom X selected from the group consisting of chlorine, fluorine, bromine and iodine or a group comprising the BH$_4$ borohydride moiety,
Cp1 and Cp2 are identical and are selected from the group consisting of indenyl groups substituted in position 2, substituted fluorenyl groups and the fluorenyl group,
P is a group bridging the 2 groups Cp1 and Cp2, and comprises a silicon or carbon atom,
b is equal to 1 or 2.

In the case of the indenyl group, position 2 denotes the position of the carbon atom which is adjacent to the carbon atom to which the bridge P is attached, whether it is the P1 or P2 bridge, as is represented in the diagram below.

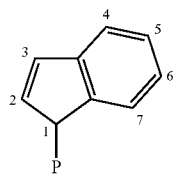

Mention may more particularly be made, as indenyl groups substituted in the 2 position, of 2-methylindenyl or 2-phenylindenyl.

Mention may be made, as substituted fluorenyl groups, of those substituted by alkyl radicals having from 1 to 6 carbon atoms or by aryl radicals having from 6 to 12 carbon atoms. The choice of the radicals is also guided by the accessibility to the corresponding molecules, which are the substituted fluorenes, because the latter are commercially available or can be easily synthesized.

Mention may more particularly be made, as substituted fluorenyl groups, of the 2,7-di(tert-butyl)fluorenyl and 3,6-di(tert-butyl)fluorenyl groups.

In the case of the fluorenyl group, positions 2, 3, 6 and 7 respectively denote the position of the carbon atoms of the rings as represented in the scheme below, the 9 position corresponding to the carbon atom to which the bridge P is attached.

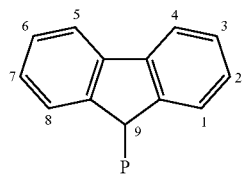

Advantageously, in formula (I) Cp$^1$ and Cp$^2$ each represent a substituted fluorenyl group or a fluorenyl group, preferably a C$_{13}$H$_8$ fluorenyl group.

The symbol Met represents a rare-earth metal atom. It should be remembered that rare-earth elements are metals and denote the elements scandium, yttrium and the lanthanides, the atomic number of which ranges from 57 to 71. The symbol Met preferably represents a lanthanide atom (Ln), more preferentially a neodymium atom (Nd).

According to one preferential embodiment of the process for synthesizing the terpolymer in accordance with the invention, the metallocene corresponds to formula (II):

{P(Flu)$_2$NdG}$_b$  (II)

in which:
Nd denotes a neodymium atom,
G denotes a group comprising the borohydride BH$_4$ moiety or denotes a halogen atom X selected from the group consisting of chlorine, fluorine, bromine and iodine,
Flu denotes a fluorenyl group of formula C$_{13}$H$_8$,
P is a group bridging the two Flu groups and comprises a silicon or carbon atom,
b being equal to 1 or 2.

According to one preferential embodiment of the invention, the symbol G denotes a chlorine atom or the group of formula (III):

(BH$_4$)$_{(1+y)}$-L$_y$-N$_x$  (III)

in which
L represents an alkali metal selected from the group consisting of lithium, sodium and potassium,
N represents a molecule of an ether,
x, which is or is not an integer, is equal to or greater than 0,
y, which is an integer, is equal to or greater than 0.

Any ether which has the ability to complex the alkali metal, in particular diethyl ether and tetrahydrofuran, is suitable as ether.

The bridge P connecting the Flu groups preferably corresponds to the formula ZR$^1$R$^2$, in which Z represents a silicon or carbon atom and R$^1$ and R$^2$, which are identical or different, each represent an alkyl group comprising from 1 to 20 carbon atoms, preferably a methyl. In the formula ZR$^1$R$^2$, Z advantageously denotes a silicon atom, Si.

The metallocene used for the preparation of the catalytic system can be in the form of a crystalline or non-crystalline powder, or else in the form of single crystals. The metallocene can be provided in a monomer or dimer form, these forms depending on the method of preparation of the metallocene, as for example is described in application WO 2007054224 A2. The metallocene can be prepared conventionally by a process analogous to that described in documents EP 1 092 731 and WO 2007054224, in particular by reaction, under inert and anhydrous conditions, of the salt of an alkali metal of the ligand with a rare-earth metal salt, such as a rare-earth metal halide or borohydride, in a suitable solvent, such as an ether, for example diethyl ether or tetrahydrofuran, or any other solvent known to those skilled in the art. After reaction, the metallocene is separated from the reaction by-products by the techniques known to those skilled in the art, such as filtration or precipitation from a second solvent. In the end, the metallocene is dried and isolated in the solid form.

According to one particularly preferential embodiment, the metallocene is of formula (IIa), (IIb), (Ic), (Id) or (Ie), in which the symbol Flu presents the fluorenyl group of formula $C_{13}H_8$.

$[\{Me_2SiFlu_2Nd(\mu\text{-}BH_4)_2Li(THF)\}_2]$ (IIa)

$[Me_2SiFlu_2Nd(\mu\text{-}BH_4)_2Li(THF)]$ (IIb)

$[Me_2SiFlu_2Nd(\mu\text{-}BH_4)(THF)]$ (IIc)

$[\{Me_2SiFlu_2Nd(\mu\text{-}BH_4)(THF)\}_2]$ (IId)

$[Me_2SiFlu_2Nd(\mu\text{-}BH_4)]$ (IIe)

Another base constituent of the catalytic system in accordance with the invention is the cocatalyst capable of activating the metallocene with regard to the polymerization, in particular in the polymerization initiation reaction. The cocatalyst is, in a well-known way, an organometallic compound. The organometallic compounds capable of activating the metallocene, such as organomagnesium, organoaluminium and organolithium compounds, may be suitable.

The cocatalyst is preferably an organomagnesium compound, that is to say a compound which exhibits at least one C—Mg bond. Mention may be made, as organomagnesium compounds, of diorganomagnesium compounds, in particular dialkylmagnesium compounds, and of organomagnesium halides, in particular alkylmagnesium halides. The diorganomagnesium compound exhibits two C—Mg bonds, in the case in point C—Mg—C; the organomagnesium halide exhibits one C—Mg bond. More preferably, the cocatalyst is a diorganomagnesium compound.

Alkylmagnesium compounds, very particularly dialkylmagnesium compounds, or alkylmagnesium halides, such as, for example, butyloctylmagnesium, dibutylmagnesium, butylethylmagnesium and butylmagnesium chloride, are particularly suitable as cocatalyst, also known as alkylating agent. The cocatalyst is advantageously butyloctylmagnesium.

The content of cocatalyst used is advantageously indexed with regard to the content of metal introduced by the metallocene; a (cocatalyst/metal of the metallocene) molar ratio preferably ranging from 1 to 100 can be used, the lowest values being more favourable for the production of polymers of high molar masses. Preferentially, the (cocatalyst/metallocene metal) molar ratio is greater than or equal to 1 and less than 10. The range of values extending from 1 to less than 10 is in particular more favourable for obtaining copolymers of high molar masses.

The catalytic system can be prepared conventionally by a process analogous to that described in documents EP 1 092 731 and WO 2007054224. For example, the cocatalyst and the metallocene can be reacted in a hydrocarbon-based solvent typically at a temperature ranging from 20 to 80° C. for a period of time of between 5 and 60 minutes. The catalytic system is generally prepared in an aliphatic hydrocarbon-based solvent, such as methylcyclohexane, or an aromatic hydrocarbon-based solvent, such as toluene. Generally, after its synthesis, the catalytic system is used in this form in the process for the synthesis of the terpolymer in accordance with the invention.

Like any synthesis carried out in the presence of an organometallic compound, the synthesis of the metallocene and that of the catalytic system take place under anhydrous conditions under an inert atmosphere. Typically, the reactions are carried out starting from anhydrous solvents and compounds under anhydrous nitrogen or argon.

The polymerization is preferably carried out in solution, continuously or batchwise. The polymerization solvent can be an aromatic or aliphatic hydrocarbon-based solvent. Mention may be made, as example of polymerization solvent, of toluene and methylcyclohexane. The monomers can be introduced into the reactor containing the polymerization solvent and the catalytic system or, conversely, the catalytic system can be introduced into the reactor containing the polymerization solvent and the monomers. The polymerization is typically carried out under anhydrous conditions and in the absence of oxygen, in the optional presence of an inert gas. The polymerization temperature generally varies within a range extending from 30° C. to 150° C., preferably from 30° C. to 120° C.

The polymerization can be halted by cooling the polymerization medium. The polymer can be recovered according to conventional techniques known to those skilled in the art, such as, for example, by precipitation, by evaporation of the solvent under reduced pressure or by steam stripping.

Preferentially, the terpolymer according to the invention is an elastomer.

This elastomer in accordance with the invention can be used in a rubber composition.

The rubber composition thus has the essential characteristic of being based on an elastomer matrix comprising the elastomer in accordance with the invention, on a reinforcing filler and on a crosslinking system.

The term "reinforcing filler" according to the invention is understood to mean, for example, carbon black, a reinforcing filler other than carbon black, in particular of aluminous or siliceous type, such as silica, with which is combined, in a known way, a coupling agent, or also a mixture of these two types of filler.

The reinforcing filler can be used at a content of between 25 and 200 parts by weight per hundred parts of the elastomer matrix (phr).

The term "elastomer matrix" is understood to mean, in the present invention, all of the elastomers present in the rubber composition, whether or not they are in accordance with the invention.

The elastomer matrix can actually contain at least one elastomer other than that in accordance with the invention, in particular an elastomer conventionally used in rubber compositions, such as polymers rich in 1,3-diene units, in particular homopolymers or copolymers of 1,3-butadiene or of isoprene.

The crosslinking system can be based on sulfur, on sulfur donors, on peroxides, on bismaleimides or on mixtures thereof. The crosslinking system is preferentially a vulcanization system, that is to say a system based on sulfur (or on a sulfur donor) and on a primary vulcanization accelerator. Additional to this base vulcanization system are various known secondary vulcanization accelerators or vulcanization activators, such as zinc oxide, stearic acid or equivalent compounds, or guanidine derivatives (in particular diphenylguanidine), or also known vulcanization retarders, incorporated during the first non-productive phase and/or during the productive phase, such as described subsequently. The sulfur is used at a preferential content of between 0.5 and 12 phr, in particular between 1 and 10 phr. The primary vulcanization accelerator is used at a preferential content of between 0.5 and 10 phr, more preferentially of between 0.5 and 5.0 phr.

The rubber composition can additionally contain other additives known to be used in rubber compositions for tires. By way of examples, mention may be made of plasticizers, anti-ozonants and antioxidants.

The rubber composition in accordance with the invention is typically manufactured in appropriate mixers, using two successive phases of preparation well known to those skilled in the art: a first phase of thermomechanical working or kneading ("non-productive" phase) at high temperature, up to a maximum temperature of between 130° C. and 200° C., followed by a second phase of mechanical working ("productive" phase) up to a lower temperature, typically of less than 110° C., for example between 40° C. and 100° C., during which finishing phase the crosslinking system is incorporated.

The rubber composition in accordance with the invention, which can be either in the uncured state (before crosslinking or vulcanization) or in the cured state (after crosslinking or vulcanization), can be used in a tire semi-finished article.

The abovementioned characteristics of the present invention, and also others, will be understood more clearly on reading the following description of several implementation examples of the invention, which are given as non-limiting illustrations.

EXAMPLE

All the reactants are obtained commercially, except the metallocenes [{Me$_2$(Flu)$_2$Nd(µ-BH$_4$)$_2$Li(THF)}] and [Me$_2$SiCpFluNd(µ-BH$_4$)$_2$Li(THF)], which are prepared according to the procedure described in documents WO 2007054224 and WO 2007054223.

The butyloctylmagnesium BOMAG (20% in heptane, C=0.88 mol·l$^{-1}$) originates from Chemtura and is stored in a Schlenk tube under an inert atmosphere. The ethylene, of N35 grade, originates from Air Liquide and is used without prepurification. The 1,3-butadiene and the styrene are purified by passage over alumina guards.

1) Determination of the Microstructure of the Polymers:

The microstructure of the polymer is determined by an NMR analysis. For these measurements, a Bruker Avance III HD 400 MHz spectrometer is used, equipped with a Bruker cryo-BBFO z-grad 5 mm probe.

The $^1$H experiments are recorded using a radiofrequency pulse with a tilt angle of 30°, the number of repetitions is 128 with a recycle delay of 5 seconds.

The HSQC (Heteronuclear Single Quantum Coherence) and HMBC (Heteronuclear Multiple-Bond Correlation) $^1$H-$^{13}$C NMR correlation experiments are recorded with a number of repetitions of 128 and a number of increments of 128. These experiments make it possible to carry out the structural assignment of the proton and carbon NMR signals.

The experiments are carried out at 25° C. The two-dimensional $^1$H/$^{13}$C experiments are used with the aim of determining the structure of the units of the polymers. 25 mg of sample are dissolved in 1 ml of CS$_2$, 100 µl of deuterated cyclohexane (C$_6$D$_{12}$).

The microstructure quantifications are carried out through the integration of the NMR signals recorded in 1D $^1$H NMR The assignment of the protons which are used for the quantification is given in Table 1a:

Table 1a: Chemical Shifts Observed for the Quantification of the Samples

The axis of the $^1$H chemical shifts is calibrated with respect to the protonated impurity of the solvent (CS$_2$) at δ$^1$H=7.18 pp.

TABLE 1

| Moieties | Scheme | δ$_{ppm}$ ($^1$H) |
|---|---|---|
| Styrene | —[CH$_2$—CH]$_n$— (with phenyl) | 8.0-6.0 |
| 1,4PB (cis and trans) | (structure) | 5.36-5.10 |
| branched 1,4PB | R = 1,2PB, 1,4PB or Ethylene | 5.10-4.90 |
| 1,2PB | (structure with CH$_2$) | 5.63-5.363 |
| Vinyl-substituted cyclohexane ring | (structure with H$_2$C) | 6.0-5.63 |
| Cyclohexane ring = EBR rings | (structure) | 1.75-1.63 |
| Ethylene | (structure) | 1.18 |

The quantifications were carried out from the integration of the 1D $^1$H NMR spectra using the Topspin software.

The integrated signals for the quantification of the different moieties are:

TABLE 2

| Moiety | δ$_{ppm}$ ($^1$H) | Integrations |
|---|---|---|
| Styrene | approximately 8.0-6.0 | I$_1$ |
| Linear 1,4PB (cis and trans) and 1,2PB | approximately 5.64-5.10 | I$_2$ |
| 1,2PB + Vinyl-substituted cyclohexane ring | approximately 4.96-4.52 | I$_3$ |
| Branched 1,4PB | approximately 5.10-4.90 | I$_4$ |
| Vinyl-substituted cyclohexane ring | approximately 6.0-5.64 | I$_5$ |
| Cyclohexane rings = EBR rings | approximately 1.75-1.63 | I$_6$ |
| Ethylene | approximately 1.18 | I$_7$ |

The quantification of the microstructure is carried out in molar percentage (molar %) as follows:

molar % of a moiety=$^1$H integral of a moiety*100/Σ($^1$H integrals of each moiety).

Starting from the integrals obtained on the $^1$H NMR spectrum:

1H Styrene=I1/5=IA
1H 1,2PB=(I3−(2I5))/2=IB
1H linear 1,4PB=(I2−IB)/2=IC
1H branched 1,4PB=I4
1H vinyl-substituted cyclohexane ring=I5
1H EBR rings=I6/2=ID
1H Ethylene=(I7−(4IC)−(3IB)−(13I5)−(14ID)−(3I4)−(3IA))/4=IG
S=IA+IB+IC+I4+I5+ID+IG is calculated.

The molar percentage of each moiety is calculated as follows:
% Styrene/total matrix=IA×100/S
% 1,2PB/total matrix=IB×100/S
% linear 1,4PB/total matrix=IC×100/S
% branched 1,4PB/total matrix=I4×100/S
% vinyl-substituted cyclohexane/total matrix=I5×100/S
% EBR rings/total matrix=ID×100/S
% Ethylene/total matrix=IG×100/S Microstructure of the Terpolymer:

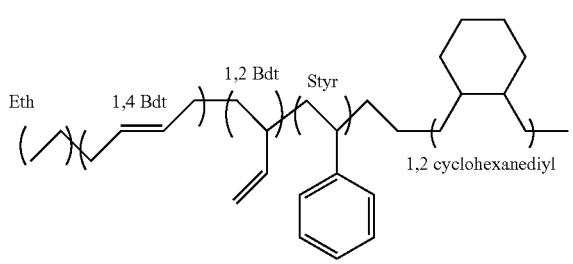

2) Determination of the Degree of Crystallinity of the Polymers:

Standard ISO 11357-3:2011 is used to determine the temperature and enthalpy of fusion and of crystallization of the polymers used by differential scanning calorimetry (DSC). The reference enthalpy of polyethylene is 277.1 J/g (according to Polymer Handbook, 4th Edition, J. Brandrup, E. H. Immergut and E. A. Grulke, 1999).

3) Determination of the Glass Transition Temperature of the Polymers:

The glass transition temperature is measured by means of a differential calorimeter (differential scanning calorimeter) according to Standard ASTM D3418 (1999).

4) Synthesis of the Polymers:

The polymers are synthesized according to the following procedure:

Example 1: Non-Compliant Example of an SEBR Synthesized According to WO 2018/104669

The polymer is synthesized according to the following procedure:

The cocatalyst, the butyloctylmagnesium (BOMAG) and then the metallocene [Me$_2$SiCpFluNd(μ-BH$_4$)$_2$Li(THF)] are added to a 500-ml glass reactor containing 300 ml of toluene. The alkylation time is 10 minutes and the reaction temperature is 20° C. The respective amounts of the constituents of the catalytic system appear in Table 2.

The first monomer to be introduced is the aromatic vinyl: styrene, for which the total amount is introduced at the start of polymerization. An ethylene/butadiene gas mixture in the desired proportions is then introduced into the reactor.

The polymerization is carried out at 80° C. and at a constant pressure of 4 bar.

The polymerization reaction is halted by cooling, degassing of the reactor and addition of 10 ml of ethanol. An antioxidant is added to the polymer solution. The copolymer is recovered by drying in an oven under vacuum to constant weight. The weight weighed makes it possible to determine the mean catalytic activity of the catalytic system, expressed in kilograms of polymer synthesized per mole of neodymium metal and per hour (kg/mol·h).

Example 2 and Example 3: Compliant Examples of SEBR According to the Invention

The polymer is synthesized according to the following procedure:

The cocatalyst, the butyloctylmagnesium (BOMAG) and then the metallocene [Me$_2$Si(Flu)$_2$Nd(μ-BH$_4$)$_2$Li(THF)] are added to a 500-ml glass reactor containing 300 ml of toluene. The alkylation time is 10 minutes and the reaction temperature is 20° C. The respective amounts of the constituents of the catalytic system appear in Table 2.

The first monomer to be introduced is the aromatic vinyl: styrene, for which the total amount is introduced at the start of polymerization. An ethylene/butadiene gas mixture in the desired proportions is then introduced into the reactor.

The polymerization is carried out at 80° C. and at a constant pressure of 4 bar.

The polymerization reaction is halted by cooling, degassing of the reactor and addition of 10 ml of ethanol. An antioxidant is added to the polymer solution. The copolymer is recovered by drying in an oven under vacuum to constant weight. The weight weighed makes it possible to determine the mean catalytic activity of the catalytic system, expressed in kilograms of polymer synthesized per mole of neodymium metal and per hour (kg/mol·h).

The respective amounts of the constituents of the catalytic system and of the monomers are shown in Table 2 and the microstructure of the terpolymer obtained as well as the physicochemical properties of the terpolymer are shown in Table 3.

Example 1 is not in accordance with the invention due to the absence of a 1,2-cyclohexanediyl ring.

Examples 2 and 3 are examples in accordance with the invention.

It should be noted that the crystallinity is greatly reduced for the polymers of Examples 2 and 3, or even eliminated for Example 3, in comparison with the polymer of Example 1.

The diene polymer of Example 1 (example not in accordance with the invention) is a diene terpolymer rich in ethylene, with a content of 78 mol % of the monomers of the terpolymer, and comprising styrene in a content of less than 10 mol % of the monomers of the terpolymer, but which exhibits a crystallinity that is still too high (degree of crystallinity greater than 10%). The polymers of Examples 2 and 3 (in accordance with the invention) exhibit a crystallinity far below that of the polymer of Example 1, although the ethylene content is far greater than that of the polymer of Example 1.

The characteristics of crystallinity and of glass transition temperature of the terpolymers of Examples 2 and 3 probably result from the microstructure of the terpolymers, in particular from the relative content of ethylene units, from the low styrene unit content and from the presence of 1,2-cyclohexanediyl rings.

The polymers of Examples 2 and 3 are entirely suitable for use in a rubber composition, in particular due to the value of their glass transition temperature of less than 0° C.

Finally, the polymers of Example 2 and 3 exhibit the most appropriate characteristics for being able to be used in a tire rubber composition since they combine both a very low crystallinity, or even a zero crystallinity, and a glass transition temperature of less than 0° C.

TABLE 2

| Example | Metallocene concentration (mmol/l) | Alkylating agent concentration (mmol/l) | Amount of styrene (ml) | Gas mixture composition (mol % Eth/Bde) |
|---|---|---|---|---|
| 1 | 0.30 | 0.65 | 10 | 95/5 |
| 2 | 0.15 | 0.75 | 20 | 90/10 |
| 3 | 0.16 | 0.83 | 20 | 80/20 |

TABLE 3

| Examples | Ethylene units (mol %) | Styrene units (mol %) | 1,2 Unit (mol %) | 1,2-Cyclohexane units (mol %) | 1,4 Units (mol %) (1) | Tg (° C.) | Crystallinity (%) |
|---|---|---|---|---|---|---|---|
| 1 | 78 | 9 | 11 | 0 | 89 | −49 | 12.2 |
| 2 | 88 | 7 | 40 | 20 | 40 | −28 | 8.6 |
| 3 | 84 | 5 | 45 | 19 | 36 | −31 | 0 |

The molar percentages are given for each type of unit relative to the units of the terpolymer (1) the content of 1,4 units is essentially the content of 1,4-trans units because the content of 1,4-cis units is not quantifiable, the signals are negligible

The invention claimed is:

1. A terpolymer of ethylene, of 1,3-butadiene and of an aromatic α-monoolefin, wherein the terpolymer contains:
   more than 60 mol % of ethylene units,
   at most 10 mol % of aromatic α-monoolefin units and 1,2-cyclohexanediyl units.

2. The terpolymer according to claim 1, in which the content of ethylene units is at least 80 mol % and at most 90 mol % of the monomer units of the terpolymer.

3. The terpolymer according to claim 1, in which the content of the 1,3-butadiene units is greater than 3 mol % of the monomer units of the terpolymer.

4. The terpolymer according to claim 1, in which the aromatic α-monoolefin is styrene, a styrene substituted by one or more alkyl groups in the para, meta or ortho positions, or mixtures thereof.

5. The terpolymer according to claim 1, in which the content of ethylene units ranges from 70 to 90 mol %, of the monomer units of the terpolymer, and the content of the 1,3-butadiene units ranges from 5 mol % to 20 mol % of the monomer units of the terpolymer.

6. The terpolymer according to claim 1, in which the 1,2 units represent at least 50 mol % of the 1,3-butadiene units.

7. The terpolymer according to claim 1, which terpolymer is an elastomer.

8. A process for the synthesis of a terpolymer defined in claim 1, which comprises the polymerization of ethylene, of 1,3-butadiene and of an aromatic α-monoolefin in the presence of a catalytic system based on a rare-earth metallocene of formula (I) and on an organometallic compound as cocatalyst, $$\{P(Cp^1)(Cp^2)Met\text{-}G\}_b \quad (I)$$

in which
   Met represents a rare-earth metal atom,
   the symbol G denoting a halogen atom X selected from the group consisting of chlorine, fluorine, bromine and iodine or a group comprising the $BH_4$ borohydride moiety,
   Cp1 and Cp2 are identical and are selected from the group consisting of indenyl groups substituted in position 2, substituted fluorenyl groups and the fluorenyl group,
   P is a group bridging the 2 groups Cp1 and Cp2, and comprises a silicon or carbon atom,
   b is equal to 1 or 2.

9. The process according to claim 8, in which the rare-earth metallocene corresponds to the formula of formula (II)

$$\{P(Flu)_2NdG\}_b \quad (II)$$

Nd denoting a neodymium atom,
   G denoting a group comprising the borohydride $BH_4$ moiety or denoting a halogen atom X selected from the group consisting of chlorine, fluorine, bromine and iodine,
   Flu denoting a fluorenyl group of formula $C_{13}H_8$,
   P being a group bridging the two Flu groups and comprising a silicon or carbon atom,
   b is equal to 1 or 2.

10. The process according to claim 9, in which the cocatalyst is a dialkylmagnesium compound or an alkylmagnesium halide.

11. The process according to claim 8, in which G denotes a chlorine atom or the group of formula (III)

$$(BH_4)_{(i+y)}\text{-}L_y\text{-}N_x \quad (III)$$

in which
   L represents an alkali metal selected from the group consisting of lithium, sodium and potassium,
   N represents a molecule of an ether,
   x, which is or is not an integer, is equal to or greater than 0,
   y, which is an integer, is equal to or greater than 0.

12. The process according to claim 8, in which the bridge P corresponds to the formula $ZR^1R^2$, Z representing a silicon or carbon atom and $R^1$ and $R^2$, which are identical or different, each representing an alkyl group comprising from 1 to 20 carbon atoms.

13. The process according to claim 8, in which the metallocene is (dimethylsilyl)(bisfluorenyl)neodymium borohydride of formulae (IIa) to (IIe):

$$[\{Me_2SiFlu_2Nd(\mu\text{-}BH_4)_2Li(THF)\}_2] \quad (IIa)$$

$$[Me_2SiFlu_2Nd(\mu\text{-}BH_4)_2Li(THF)] \quad (IIb)$$

$$[Me_2SiFlu_2Nd(\mu\text{-}BH_4)(THF)] \quad (IIc)$$

$$[\{Me_2SiFlu_2Nd(\mu\text{-}BH_4)(THF)\}_2] \quad (IId)$$

$$[Me_2SiFlu_2Nd(\mu\text{-}BH_4)] \quad (IIe)$$

Flu representing the $C_{13}H_8$ group.

14. A rubber composition based on a reinforcing filler, a crosslinking system and a terpolymer defined according to claim 1.

15. A tire which comprises a composition defined in claim 14.

16. The terpolymer according to claim 1, wherein the terpolymer contains at least 70 mol % of ethylene units.

17. The terpolymer according to claim 1, in which the content of the 1,3-butadiene units is less than 20 mol % of the monomer units of the terpolymer.

18. The terpolymer according to claim 1, in which the aromatic α-monoolefin is styrene.

19. The terpolymer according to claim 1, in which the content of ethylene units ranges from 80 to 90 mol % of the monomer units of the terpolymer, and the content of the 1,3-butadiene units ranges from 5 mol % to 15 mol % of the monomer units of the terpolymer.

20. The process according to claim 8, in which the cocatalyst is butyloctylmagnesium, dibutylmagnesium, butylethylmagnesium or butylmagnesium chloride.

* * * * *